May 22, 1962 D. KLEIS 3,036,164
ECHO EFFECT RECORDING
Filed Aug. 31, 1955

INVENTOR
DERK KLEIS
BY [signature]
AGENT

United States Patent Office 3,036,164
Patented May 22, 1962

3,036,164

ECHO EFFECT RECORDING

Derk Kleis, Eindhoven, Netherlands, assignor to North American Philips Company, Inc., New York, N.Y., a corporation of Delaware Filed Aug. 31, 1955, Ser. No. 531,651
Claims priority, application Netherlands Sept. 1, 1954
3 Claims. (Cl. 179—100.2)

Figure 1:
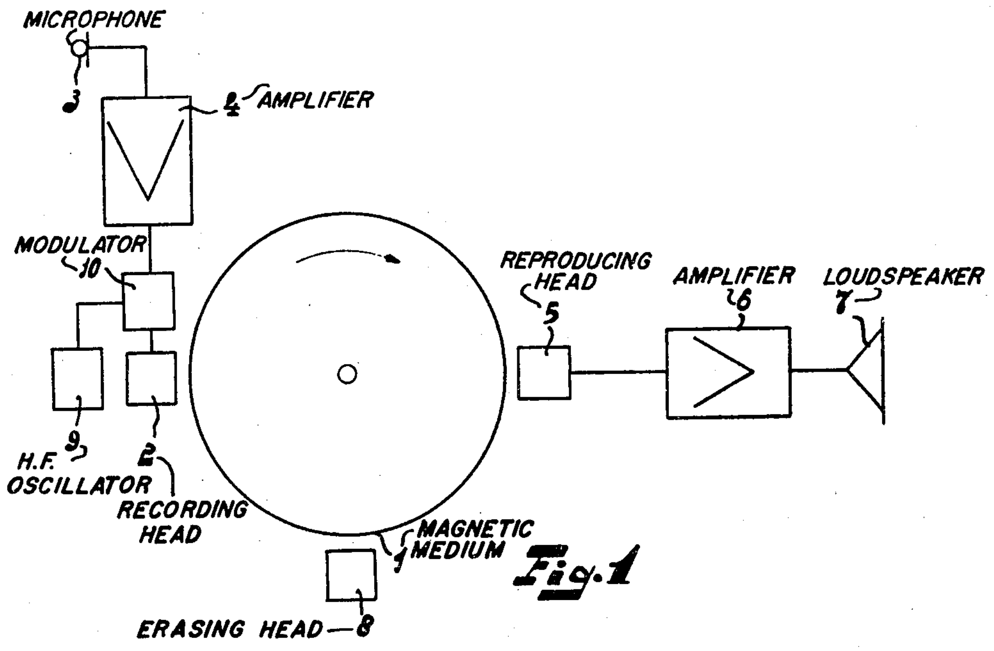

The present invention relates to sound recording and reproduction. More particularly, the invention relates to reproducing a series of signals, for example music, if desired with adjustable echo effect, by the use of magnetic recording. The series of signals is recorded on an endless movable magnetic recording medium with the aid of a high-frequency bias current and is reproduced during recording by means of one or a plurality of magnetic reproducing heads.

In accordance with the present invention the high-frequency bias current with the aid of which the series of signals is recorded on the magnetic medium, is given a value such that each time a signal of the series which has already been recorded is passing in operative proximity to the recording head, this signal is partially erased as a function of the echo effect desired. The magnetic recording medium has the form of a drum provided with magnetic material on the outerside, the lateral peripheral width of the drum having the same width as the recording and reproducing head. Erasing of the recorded signal in part "as a function of the desired echo effect," occurs simultaneously in two different ways, first, due to the high-frequency bias (the smaller the amplitude of this bias, the smaller the erasing effect), second, due to the switching-on of the erasing head. The lower the speed, the lesser the erasing effect. In this manner, the echo effect may, consequently, be increased. Since it is desired to reduce the energy for erasing, if a particular echo time is desired, the extent that the amplitude of the bias and/or the velocity of the erasing head must be varied may be readily calculated in advance.

If the echo time is to be reduced, the method in which the amplitude of the bias is increased is preferably not used, since the signals already recorded are affected to a greater extent, and the signals recorded with the aid of the said bias can be acted upon only with greater difficulty. Consequently, the partial erasing with the aid of the bias is to be considered as a coarse adjustment of the echo time, and the second method, i.e. the velocity control of the erasing head, provides a fine adjustment. Consequently, if in accordance with the invention, a signal A, after passing in operative proximity to the reproducing head or heads, again passes in operative proximity to the recording head, then a portion of the signal A, that is, the portion which has not been erased by the additional current occurs in bias to the signal B which is provided on the magnetic recording medium at the area of the signal A. The loudspeaker which just before has reproduced an unattenuated signal A now reproduces the same signal A in the attenuated form together with signal B. This means that signal A is partly erased. Upon the subsequent revolution, the reproduction is constituted by a new signal C, an attenuated signal B and a further attenuated signal A, the extent of attenuation being also determined by the amplitude of the present bias current. Since an arbitrary signal of the series is transmitted several times in succession with a steadily decreasing strength, an echo effect is introduced in the reproduction of a series of signals in a very advantageous manner, in accordance with the invention. In contradistinction to known echo installations, the method according to the invention requires the use of only one reproducing head, although it is quite possible to increase the number of reproducing heads. Furthermore, the erasing head for completely eliminating the signal already reproduced is dispensed with.

The extent of attenuation of a signal which continuously rotates on the magnetic recording medium is determined not only by the present strength of the additional current, but also by the frequency of the passing signal, since it has been found that signals of higher frequencies demagnetize themselves under the action of adjacent magnetic forces. This results in the strength of all recorded signals being at a maximum value on the outer surface of the magnetic recording medium; said outer surface being scanned by the reproducing heads. The strength of the recorded signals decreases in value toward the center of the medium to an extent dependent upon frequency, in the sense that the signals of higher frequencies decrease in strength to a greater extent. Since the erasing action of a high frequency bias field is greatest at the outer surface, the high frequencies in the vicinity thereof are affected to a greater extent than the lower frequencies which are distributed more homogeneously. This accounts for the fact that the frequency composition of a signal varies during the partial erasure. In view of the effect aimed at by the invention, the erasing additional field may not be given a strength such that the record is erased throughout the thickness of the magnetic recording medium. Consequently, in the region of the lower frequencies, in and adjacent to the center of the medium, signals may occur which cannot be erased irrespective of the rotational speed of the magnetic recording medium and which thus invariably produce background noise during reproduction. Since the series of signals is recorded on the magnetic medium continuously, all these permanent signals are added and may lead to a disturbed reproduction.

In order to avoid the disadvantage of background noise, in accordance with the present invention, an erasing head is moved over the width of the magnetic medium during recording, the erasing action extending only over part of the width of the magnetic track, and the displacement of the erasing head per revolution of the magnetic recording medium being not larger than the widths of the erasure track.

The erasing effect is such that the record at the area of the erasing gap is erased completely, but the width of the total magnetic track is erased only in part due to the particular dimensions of the erasing head which has a relatively small gap width.

Figure 2:
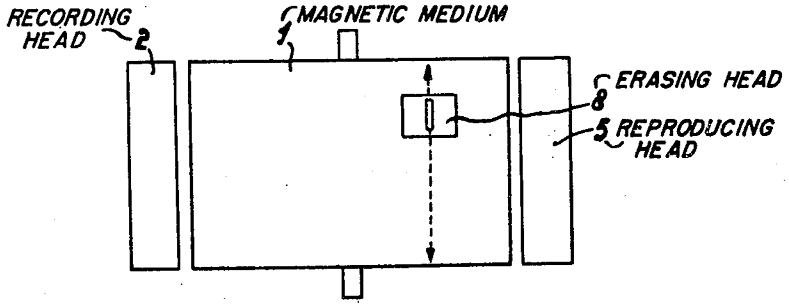

In order that the invention may be readily carried into effect, it will now be described, by way of example, with reference to the accompanying drawing, wherein:

FIG. 1 is a schematic diagram of a preferred embodiment of the apparatus of the present invention; and FIG. 2 is a side view of the magnetic recording medium and the erasing head of the apparatus of FIG. 1.

FIG. 1 shows a system for reproducing a series of signals. The series of signals is recorded, on an endless movable magnetic medium 1 (in the form of a drum) with the aid of a high-frequency bias current. The low-frequency signals picked up by microphones 3 are fed, via an amplifier 4, to a modulator; the high frequency bias current supplied by a high frequency oscillator 9 also being supplied to the modulator 10. Both currents are then led to a recording head 2. During recording, the series of signals is reproduced by means of a reproducing head 5 via an amplifier 6 and a loudspeaker 7. The high-frequency bias current is given a value such that each time a signal which has already been recorded, passes in operative proximity to the head 2, this signal is erased in part as a function of the echo effect desired.

FIG. 2 is a side view of the magnetic recording medium 1. An erasing head 8 is arranged in operative proximity to the outer surface of the medium 1 and, according to the invention, is moved over the width of said medium during recording, the erasing action extending only over part of the width of the magnetic track. The gap width of the erasing head 8 is smaller than the width of the record formed on the medium 1, and the displacement of the head per revolution of the recording medium is not greater than the width of the erasure track. The head 8 is moved in the directions indicated by the arrows. Once the head has traversed the path from one side of the magnetic recording medium to the other, this path is erased completely, although in the meantime new signals have appeared on the recording medium.

What is claimed is:

1. Magnetic recording apparatus for reproducing a series of signals with echo effect, comprising an endless magnetic recording medium having a given recording width and movable in a direction transverse to said width, a magnetic recording head for recording said series of signals on said medium with the aid of a bias current, said recording head having a gap width equal to said recording width, said bias current having a value at which a recorded signal on said medium is partially erased each time the said medium passes in operative proximity to said recording head, a magnetic reproducing head for reproducing said series of signals during recording, said reproducing head having a gap width equal to said recording width, and a signal erasing magnetic head having an effective gap width less than said given recording width and movable over the width of said medium during the recording of said signals thereby to partially erase said recorded signal each time the said medium passes in operative proximity to said erasing head.

2. Magnetic recording apparatus for reproducing a series of signals with echo effect, comprising an endless magnetic recording medium having a given recording width and movable in a direction transverse to said width, a magnetic recording head for recording said series of signals on said medium with the aid of a high frequency bias current, said recording head having a gap width equal to said recording width, said bias current having a value at which a recorded signal on said medium is partially erased each time the said medium passes in operative proximity to said recording head, a magnetic reproducing head for reproducing said series of signals during recording, said reproducing head having a gap width equal to said recording width, and a signal erasing magnetic head having an effective gap width less than said given recording width and movable over the width of said medium during the recording of said signals thereby to partially erase said recorded signal each time the said medium passes in operative proximity to said erasing head.

3. Magnetic recording apparatus for reproducing a series of signals with echo effect, comprising an endless magnetic recording medium having a given recording width and movable in a direction transverse to said width, a magnetic recording head for recording said series of signals on said medium with the aid of a bias current, said recording head having a gap width equal to said recording width, said bias current having a value at which a recorded signal on said medium is partially erased each time the said medium passes in operative proximity to said recording head, a magnetic reproducing head for reproducing said series of signals during recording, said reproducing head having a gap width equal to said recording width, and a signal erasing magnetic head having an effective gap width less than said given recording width and movable over the width of said medium during the recording of said signals thereby to partially erase said recorded signal each time the said medium passes in operative proximity to said erasing head, the displacement of said erasing head per complete revolution of said medium being limited to the width of an erasure track which is substantially less than said given recording width.

References Cited in the file of this patent

UNITED STATES PATENTS

| | | |
|---|---|---|
| 2,512,015 | Graveel | June 20, 1950 |
| 2,540,406 | Ranger | Feb. 6, 1951 |
| 2,600,046 | Bobb | June 10, 1952 |
| 2,610,257 | Wissmann | Sept. 9, 1952 |
| 2,804,499 | Butts | Aug. 27, 1957 |

FOREIGN PATENTS

| | | |
|---|---|---|
| 696,899 | Great Britain | Sept. 9, 1953 |